Jan. 15, 1935. J. C. BUCHANAN ET AL Re. 19,423

ROTARY COMPRESSOR

Original Filed March 17, 1930 2 Sheets-Sheet 1

Inventor

John C. Buchanan,
Earl J. Hubacker by Charles W. Hills Attys

Jan. 15, 1935. J. C. BUCHANAN ET AL Re. 19,423

ROTARY COMPRESSOR

Original Filed March 17, 1930 2 Sheets-Sheet 2

Inventor

John C. Buchanan,
Earl J. Hubacker.

By: Charles Wells Attys.

Reissued Jan. 15, 1935

Re. 19,423

UNITED STATES PATENT OFFICE 19,423

ROTARY COMPRESSOR

John C. Buchanan and Earl F. Hubacker, Detroit, Mich., assignors to Norge Corporation, Detroit, Mich., a corporation of Michigan Original No. 1,913,657, dated June 13, 1933, Serial No. 436,282, March 17, 1930. Application for reissue August 20, 1934, Serial No. 740,702

4 Claims. (Cl. 230—149)

This invention relates to rotary pumps of the type used for handling fluid or gases for either evacuation or compression thereof.

It is an object of this invention to provide an improved and simplified compressor assembly wherein the compressor cylinder is exposed for efficient air cooling while having locating flanges for attachment to end closures incorporating suction and discharge connections, the discharge side being formed as a lubricant reservoir, wherein the lubricant also acts as a fluid seal for the discharge end of the compressor. Heretofore rotary compressors have been submerged in a lubricant bath within an enclosing casing, but such a construction requires that the heat generated in the compressor must be transmitted through the lubricant bath to the outer casing with the result that the lubricant is unduly heated and the compressor will operate at undesirably high temperatures, further increasing the load on the condenser of a refrigerating apparatus, for example.

It is also an object of this invention to provide a lubricant bath on the discharge side of a rotary compressor and subjected to the discharge pressure thereof, the partition blade of the compressor being backed by the lubricant pressure so that the blade is both directly lubricated thereby and is maintained in contact with the rotor of the compressor by the discharge pressure generated thereby.

It is another object of this invention to provide an improved and simplified rotary compressor that can be economically manufactured, assembled and serviced.

Other and further important objects of this invention will be apparent from the disclosures in the specification and the accompanying drawings.

As shown:—

Figure 1:
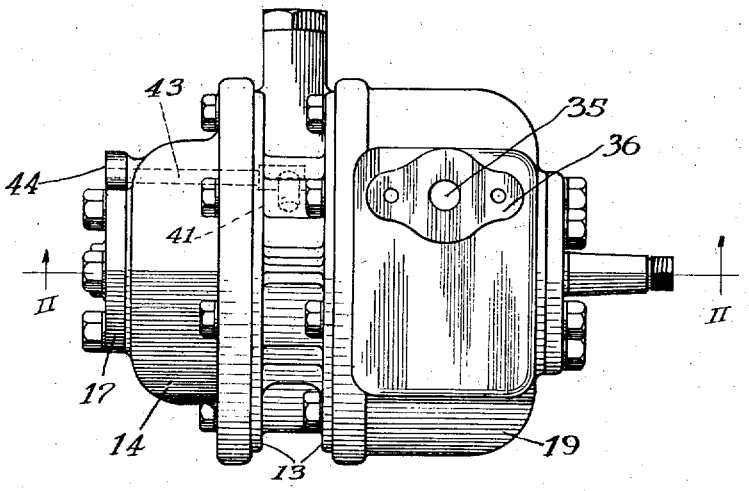
Figure 1 is a top plan view of a rotary compressor embodying the features of this invention.
Figure 2:
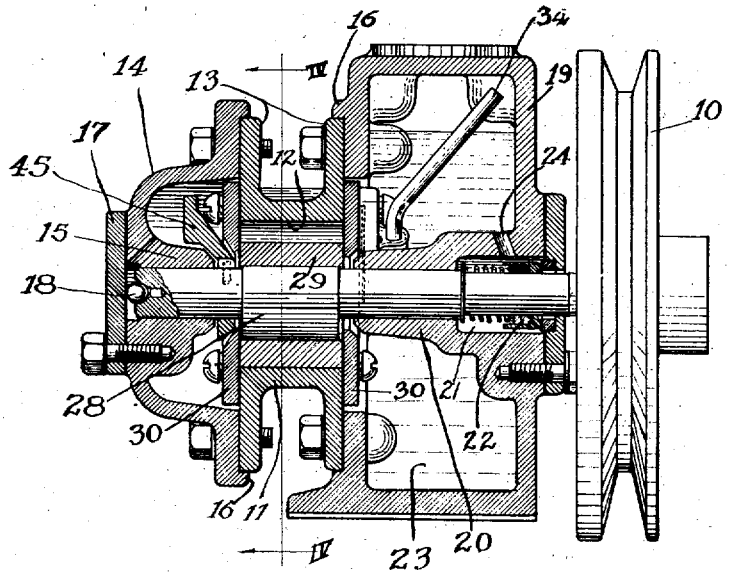
Figure 2 is a longitudinal section on the line 2—2 of Figure 1.

The compressor chosen for illustrative purposes is of the belt driven type, as indicated by the belt pulley 10 in Figure 2, but may, of course, be driven in any convenient manner from a suitable prime mover. The illustrated embodiment of this invention is primarily intended for use in domestic refrigerating apparatus, although it is adaptable to a wide variety of other uses.

The compressor comprises a body 11 having a central cylindrical bore 12 with outstanding end flanges 13, the faces of which are finished parallel to each other and at right angles to the cylindrical bore, the outer perimeter of the flanges being finished concentric with the bore to provide locating surfaces for end closures to be hereinafter described.

A rear closure 14, carrying a shaft bearing 15 concentric with the cylindrical bore, is applied to the face of one flange of the cylinder and located thereon by an overlapping lip 16 engaging the perimeter of the flange. The rear face of the closure 14 is covered by a plate 17 holding a ball 18 which acts as a thrust bearing for the shaft to be hereinafter described.

A front closure 19 is similarly applied to and located on the other cylinder flange and includes a concentric front shaft bearing 20 and a stuffing box 21 containing a seal 22. The closure 19 is formed with an oil reservoir 23 into which the compressor discharges above the lubricant therein, this oil reservoir feeding into the stuffing box location through a passage 24 and back of the partition blade 25 through a passage 26 shown in Figures 3 and 4.

A shaft 27, having a tapered and threaded end to receive the driving pulley 10, is mounted in the bearings 15 and 20 and carries an eccentric 28 within the cylindrical bore. A rotor or sleeve 29 is mounted on the eccentric and is so proportioned as to just clear the cylinder wall at the position of maximum eccentricity of the shaft eccentric. This sleeve floats on the eccentric and is therefore free to roll within the cylinder as it is oscillated therein by the rotation of the shaft and eccentric.

The sleeve is of the same length as the depth of the cylinder bore and end sealing plates 30 are mounted on each flange of the cylinder body inside the respective end closures, these plates being apertured for the shaft but overlapping the ends of the sleeve to make sealing contact therewith. The end sealing plate inside the front closure 19 is provided with a discharge port 31 on the discharge side of the partition blade 25 which port is covered by a flap valve 32, shown in dotted lines in Fig. 3, the valve in turn being covered by a cap 33 having an outlet tube 34 extending upwardly within the lubricant reservoir above the lubricant level therein. An outlet port 35 and mounting flange 36 are provided on top of the reservoir for attachment of suitable discharge connections, not shown.

The partition blade 25 reciprocates in a suitable slot 37 in the cylinder wall and is backed by a spring 38 in a chamber 39 in a boss 40, the chamber being in communication with the lubricant reservoir through the passage 26 previously mentioned so that the discharge pressure of the compressor acts through the lubricant to cause the blade to maintain contact with the sleeve 29 during oscillation thereof. The passage 26 is drilled through the flanges 13, cylinder body 11, and the mounting flange of the front closure and in manufacturing serves to provide end clearance when broaching the blade slot 37.

Figure 3:
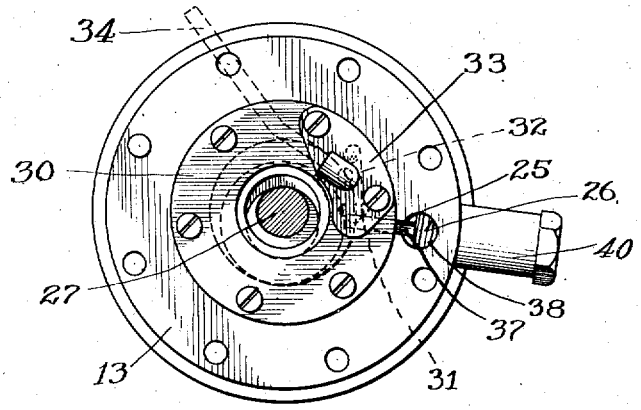
Figure 3 is a front elevation of the compressor with the lubricant reservoir omitted.

A suction passage 41 is provided in a boss 42 on the wall of the cylinder on the opposite side of the partition blade to the discharge port 31, shown in dotted lines in Figure 3. A passage 43 through the rear cylinder flange communicates with a mounting flange 44 carried by the rear closure 14, for attaching the suction line, not shown.

If desired, a counterweight 45 can be mounted on the shaft 27 within the rear closure 14, to balance the weight of the eccentric and sleeve on the shaft, and thus assure smooth operation at high speeds.

Figure 4:
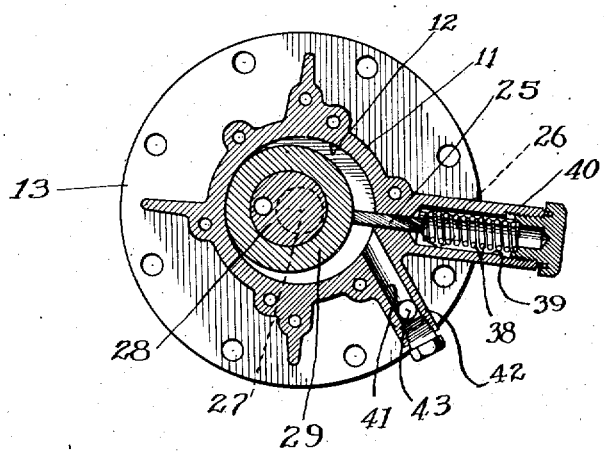
Figure 4 is a section on the line 4—4 of Figure 2.

In the operation of the compressor of this invention, reference may be made to Figures 2 and 4. In Figure 4 the shaft 27 and eccentric 28 rotate clockwise so that the crescent shaped pumping space between the sleeve 29 and the cylinder 12 also shifts clockwise in the cylinder. The partition blade 25 serves to divide the compression space into suction and compression spaces, the suction space below the blade increasing in area during the rotation of the shaft and thus creating a suction which draws in the working fluid through the suction passage 41. When the shaft has rotated a little more than 180° from the position shown the point of maximum eccentricity of the sleeve 29 will pass over the suction port or passage simultaneously ending the suction period, starting compression of the working fluid, ahead of the point of maximum eccentricity and starting a new suction period back of the point of maximum eccentricity. It is not to be understood that compression is actually essential as a liquid may be handled, in which case the so-called compression period is really a discharge period, the fluid being forced out past the discharge valve 32 shown in Fig. 3. The only difference in operation on a gas or liquid is that with a gas under compression the discharge valve is held closed by back pressure until the compressor pressure builds up by further movement of the eccentric until it reaches the value of the discharge or back pressure.

Since the compressor discharges above the level of lubricant in a reservoir enveloping the discharge side of the compressor, the pressure developed by the operation thereof forces lubricant against the exposed working parts of the compressor, and sufficient leakage occurs, especially on the suction side of the partition blade, to assure a sufficient supply of lubricant to the compressor which lubricant is carried out by the discharge and separated from the working fluid in the upper part of the lubricant reservoir. Since the lubricant is also fed back of the partition blade through the port 26, it acts to supplement the spring pressure to cause the partition blade to maintain sealing contact with the sleeve or rotor throughout the movement thereof.

It will thus be seen that we have invented an improved and simplified rotary compressor embodying direct air cooling with a lubricating bath for sealing and lubricating the compressor.

We are aware that many changes may be made and numerous details of construction may be varied through a wide range without departing from the principles of this invention, and we, therefore, do not propose limiting the patent granted hereon otherwise than necessitated by the prior art.

We claim as follows:—

1. A rotary pump comprising an open-ended cylinder having a concentric annular outstanding flange on each end thereof providing for air cooling of the cylinder, longitudinally extending end closure housings for said cylinder secured concentrically on said flanges, shaft bearings in said housings, a shaft journaled in said bearings carrying an eccentric housed within said cylinder, a rotor on said eccentric in pumping relation to said cylinder, end sealing members in said housings secured stationary to said flanges and in sealing contact with the ends of said rotor, one of said closure housings providing a reservoir for lubricant to normally extend above the working level of said rotor, and being provided with a discharge outlet for the working fluid, and conduit means for leading the discharge of working fluid and lubricant from said cylinder through an end seal in said last-named housing.

2. A rotary pump comprising an open-ended cylinder having planular end surface portions contiguous to the cylindrical bore of the cylinder, said cylinder having a single substantially solid side wall of substantial thickness, surrounding said cylindrical bore, a pair of end sealing members rigidly secured to said cylinder end surface portions, a pair of end closure housings having bearings formed concentrically relative to said cylindrical bore, said end closure housings being removably secured upon said cylinder end surface portions outside of said end sealing members, a shaft journaled in said bearings carrying an eccentric within the bore of said cylinder, a rotor on said eccentric in pumping relation to said cylinder, one of said closure housings providing a reservoir for lubricant to normally extend above the working level of said rotor, and conduit means within said housing for leading the discharge of working fluid and lubricant from said cylinder into said housing.

3. A rotary pump comprising an open-ended cylinder having a bore, planular end surface portions contiguous to said bore, and a side wall of substantial thickness surrounding said bore, a pair of end sealing members rigidly secured to said cylinder end surface portions and having planular inner surfaces, a pair of end closure housings, said housings having bearings therein formed concentrically relative to said cylindrical bore, said end closure housings being removably secured upon said cylinder end surface portions outside of said end sealing members to provide a working fluid and lubricant reservoir surrounding said cylinder, a shaft journaled in said bearings and carrying an eccentric within the bore of said cylinder, a rotor mounted rotatably upon said eccentric in pumping relation to said cylinder and providing a working fluid space within said bore, said rotor having planular end surfaces fixedly positioned with respect to each other, said lubricant in said reservoir normally extending above the working level of said rotor, a reciprocable blade disposed within said cylinder, said blade having an end projecting inwardly through said cylinder bore in sliding engagement with the periphery of said rotor, means communicating with one side of said blade for admitting working fluid from without said reservoir to said working fluid space within said bore, means communicating with the opposite side of said blade for discharging said working fluid from said working fluid space within said bore to the upper part of said working fluid and lubricant reservoir, said rotor and blade having portions thereof contiguous to said working fluid space exposed to said lubricant in said reservoir whereby leakage of said lubricant may occur around said rotor and blade for sealing said working fluid space within said bore and for lubricating said rotor and blade, and whereby said blade may be maintained in sliding contact with said rotor.

4. In a fluid pump, the combination of a cylinder member having a cylindrical bore therethrough, a circular rotor member positioned in said bore in pumping relation with the cylindrical wall of said bore, said rotor having planular end surfaces fixedly positioned with respect to each other, a housing secured to said cylinder and comprising a pair of closure members, a shaft journaled concentrically of said cylindrical bore in bearings within said housing and having an eccentric portion upon which said rotor member is freely journaled, a pair of sealing plates fixedly secured in fluid tight relationship with said cylinder member within said housing and having planular inner surfaces cooperable with the planular end surfaces of said rotor member to define a pumping chamber, said cylinder member having a slot in the outer wall thereof, a sealing blade reciprocable in said slot and having its inner end in bearing contact with said rotor member, said rotor member being free to move axially of said shaft with respect to said shaft and said sealing plates so as to center itself between said sealing plates, the outer end of said slot and the planular end surfaces of said rotor being in communication with a body of lubricant in said housing under the discharge pressure of said pump to cause slight leakage of said lubricant into said pumping chamber past said sealing blade and said sealing plates to lubricate said pump and prevent fluid leakage from said pumping chamber.

JOHN C. BUCHANAN.
EARL F. HUBACKER.